United States Patent [19]
Kokura

[11] Patent Number: 4,963,803
[45] Date of Patent: Oct. 16, 1990

[54] NUMERICALLY CONTROLLED MACHINE TOOL

[75] Inventor: Masuo Kokura, Tokyo, Japan

[73] Assignee: Fanuc Ltd, Minamitsuru, Japan

[21] Appl. No.: 392,924

[22] PCT Filed: Dec. 9, 1988

[86] PCT No.: PCT/JP88/01243

§ 371 Date: Sep. 13, 1989

§ 102(e) Date: Sep. 13, 1989

[87] PCT Pub. No.: WO89/05484

PCT Pub. Date: Jun. 15, 1989

[30] Foreign Application Priority Data

Dec. 11, 1987 [JP] Japan ................... 62-312085

[51] Int. Cl.$^5$ ............................. G05B 19/18
[52] U.S. Cl. ................. 318/569; 318/568.1; 318/568.2; 364/474.23
[58] Field of Search .................. 318/569, 568.1, 568.2; 364/474.23

[56] References Cited

U.S. PATENT DOCUMENTS 4,092,720  5/1978  Carey .............................. 364/474.23
4,558,419  12/1985  Kanematsu ........................ 318/569
4,684,862  8/1987  Röhrle ............................ 318/568.2

*Primary Examiner*—William M. Shoop, Jr.
*Assistant Examiner*—Saul M. Bergmann
*Attorney, Agent, or Firm*—Staas & Halsey

[57] ABSTRACT

An improvement applicable to a multi-axis numerically controlled machine tool for the purpose to enable the means small in capacity. A numerically controlled machine tool provided with plural axes and which is driven by plural driving motors (SP(n)) each of which is attached by an angular position sensor (POS(n)) is provided with (a) a plurality of numerical controller (CNC(n)) each of which is provided with a programmable controller (PMC(n)) for controlling the plural driving motors (SP(n)) in response to external numerical information, and (b) a numerical controller changing-over network (COC) having plural changing-over circuits (COS(n)) for connecting each of the selected ones of the plural angular position sensors (POS(n)) and of the controllers of the driving motors and the corresponding each of the selected ones of the plural numerical controllers (CNC(n)), in response to the changing-over signal (CO) generated by the plural programmable controllers (PMC(n)). As a result, each of the selected numerical controllers (CNC(n)) is allowed to be fed, in the reverse sense, an arbitrarily selected one of the angular position signals (P(n)) sensed by the arbitrary one of the angular position sensors (POS(n)), enabling the selected driving shaft to be controlled in response to the aforementioned angular position signal (P(n)).

1 Claim, 1 Drawing Sheet

NUMERICALLY CONTROLLED MACHINE TOOL

TECHNICAL FIELD OF THE INVENTION

This invention relates to an improvement applicable to a numerically controlled machine tool. More specifically, this invention relates to an improvement applicable to a numerically controlled machine tool, for the purpose to enable a group of numerical control equipment to control a numerically controlled machine tool having plural axes and plural driving shafts.

BACKGROUND OF THE INVENTION

A numerically controlled machine tool is generally provided with plural axes and plural driving shafts such as spindles, feeder shafts or the like. Such a numerically controlled machine tool as is provided with plural axes generally requires a large scale numerical control equipment having plural control elements. Since such large scale numerical control equipment is complicated in structure.

This invention employs plural small scale numerical control equipment, which is simple in structure, in parallel to each other, in order to control the foregoing numerically controlled machine tool having plural axes.

This idea can be applied to machining wherein relative motion is required between different spindles, between one or more spindles and one or more feeder shafts, and/or, between different feeder shafts. To achieve this, each control equipments for driving shafts and each negative feedback circuits which feeds back signals representing the angular position (hereinafter referred to as angular position signals) of the shafts to the control equipments is required to be connected with the numerical control equipment which controls another axis that must rotate to keep the foregoing relative motion. However, a numerically controlled machine tool that can be connected to for driving a shaft and that including a negative feedback circuit which feeds back the angular position signal of the driving shaft to the control equipment and that includes a means for connecting relevant negative feedback circuit with the numerical control equipment which controls another axis which is required to rotate so as to maintain relative motion with the driving shaft, is not presently available.

SUMMARY OF THE INVENTION

An object of this invention is to provide a multi-axis numerically controlled machine tool provided with plural numerical control equipment which are small in capacity and simple in structure and that can effect relative motion among arbitrary driving shafts.

Another object of this invention is to provide a multi-axis numerically controlled machine tool provided with equipment for selectively connecting the control equipment of an arbitrary driving shaft and the negative feedback circuit providing an angular position signal for the arbitrary driving shaft with numerical control equipment for controlling another shaft which is required to rotate in connection with the arbitrary driving shaft; resultantly allowing the numerically controlled machine tool to maintain the relative motion among the aforementioned specific axes.

To achieve the aforementioned objects, a numerically controlled machine tool provided with plural axes and which is driven by plural driving motors (SP(n)) each of which is attached by an angular position sensing means (PSD(n)) is provided with:

(a) a plurality of numerical control means (CNC(n)) each of which is provided with a programmable controller (PMC(n)) for controlling the plural driving motors (SP(n)) in response to external numerical information, and (b) a numerical control means changing-over means (COC) having plural changing-over circuits (COS(n)) for connecting each of the selected ones of the plural angular position sensing means (POS(n)) and of the control means of the driving motors and the corresponding seclected ones of the plural numerical control means (CNC(n)), in response to the changing-over signal (CO) generated by the plural programmable controllers (PMC(n)). As a result, each of the selected numerical control means (CNC(n)) is allowed to be fed, in the reverse sense, an arbitrarily selected one of the angular position signals (P(n)) sensed by the arbitrary one of the angular position sensing means (POS(n)), resultantly enabling the selected driving shaft to be controlled in response to the aforementioned angular position signal (P(n)).

A numerically controlled machine tool in accordance with this invention functions as described below.

(a) A numerically controlled machine tool in accordance with this invention is provided with plural numerical control means (CNC(n)) which are small in capacity and simple in structure, and each of these plural numerical control means (CNC(n)) which are small in capacity and simple in structure is designed to be connected with an angular position sensing means (POS(n)) and a means for controlling a driving motor selected in response to external numerical information (not shown), by means of a numerical control means changing-over means (COC) which is controlled by a programmable controller (PMC(n)) controlled in response to the aforementioned external numerical information.

(b) Therefore, an angular position signal (P(n)) sensed by an arbitrarily selected angular position sensing means (POS(n)) is fed, in the reverse sense, to a numerical control means (CNC(n)) arbitrarily selected by means of the foregoing numerical control means changing-over means (COC) in response to a changing-over signal (CO) generated by the foregoing programmable controller.

(c) As a result, whenever relative motion is required among different axes, the angular position signal (P(n)) of each driving shaft is fed, in the reverse sense, to the numerical control means (CNC(n)) which controls the driving shaft which is required to rotate in relation to each other. This enables the numerical control means (CNC(n)) to control the driving shaft as required.

(d) In this manner, a numerically controlled machine tool having plural axes is allowed to be controlled by means of plural numerical control means (CNC(n)) that are small in capacity and simple in structure.

BRIEF DESCRIPTION OF THE DRAWING

A more detailed description will be presented below for a numerically controlled machine tool in accordance with one embodiment of this invention, referring to a drawing referred to below.

DETAILED DESCRIPTION OF THE PREFERRED EMBODIMENT

Figure 1:
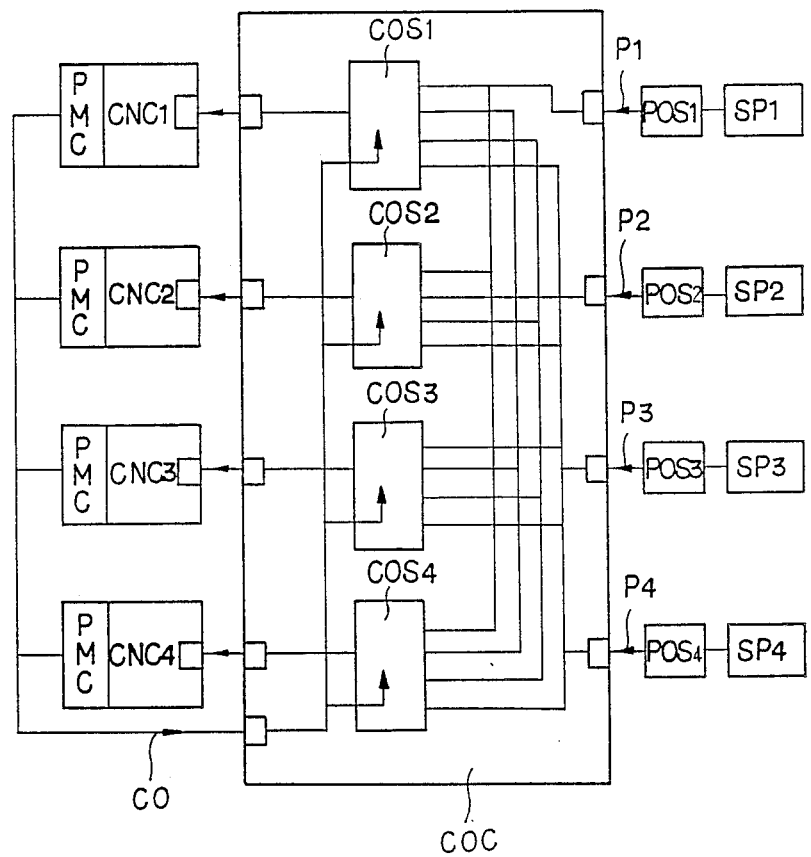
FIG. 1 is a block diagram of a numerically controlled machine tool in accordance with one embodiment of this invention.

Referring to FIG. 1, SP(n) designates each driving motor. In FIG. 1, four driving motors are illustrated. Each of the driving motors SP(n) is provided with an angular position sensing means POS(n). Although controlled power supply circuits are required for driving the driving motors SP(n), they are not shown in FIG. 1.

In FIG. 1, CNC(n) designates a numerical control means and four numerical control means are illustrated. Each of the numerical control means CNC(n) is provided with a programmable controller PMC(n). Although these numerical control means CNC(n) and programmable controllers PMC(n) which are attached thereto receive external numerical information, the circuits which provide the information are not illustrated in FIG. 1.

COC designates a numerical control means changing-over means, which is provided with plural changing-over circuits COS(n), of which (4) four circuits COS(n) are illustrated in FIG. 1. Each of the changing-over circuits COS(n) changes over the plural angular position sensing means POS(n) and the control means (not shown) of the driving motors, in response to a changing-over signal CO generated by a programmable controller PMC(n) following external commands (not shown).

As a result, an arbitrary selected numerical control equipment CNC(n) is connected with an arbitrarily selected driving motor SP(n), and whenever related motion is required between a spindle and another spindle, between a spindle and a feeder shaft, or between a feeder shaft and another feeder shaft, an angular position signal P(n) of an arbitrary driving shaft SP(n) is fed, in the reverse sense, to a numerical control means CNC(n) which controls another arbitrary shaft which is required to maintain relative motion with the foregoing arbitrary driving shaft SP(n). Thus, a control means that supplies electric current to a driving motor so as to drive the arbitrary axis, is allowed to control various axes so as to maintain the desired relative motion. As a result, relative motion can be realized between a spindle and another spindle, between a spindle and a feeder shaft, or between a feeder shaft and another feeder shaft. Accordingly, a numerically controlled machine tool having plural axes is allowed to be controlled with plural numerical control means CNC(n) that are small in capacity and simple in structure.

The foregoing description has clarified that this invention successfully provided a numerically controlled machine tool wherein relative motion between a spindle and another spindle, between a spindle and a feeder shaft, or between a feeder shaft and another feeder shaft, is realized by means of plural numerical control means small in capacity and simple in structure.

Although the above description was presented with reference to a specific embodiment, this embodiment is not meant to be construed in a limiting sense. Various other embodiments and/or modifications of this invention will become apparent to persons skilled in the art upon reference to the description of this invention. It is therefore contemplated that the claim will cover any such embodiments and/or modifications as fall within the true scope of this invention.

I claim:

1. A numerically controlled machine tool having plural axes and being driven by a plurality of driving motors (SP(n)) each of which has an angular position sensing means (POS(n)) that provides an angular position signal (P(n)), comprising:
   a plurality of numerical control means (CNC(n)) for controlling the plurality of driving motors (SP(n)) in response to externaol numerical information, each of said numerical control means (CNC(n)) includes
      a programmable controller means (PMC(n)) for generating a changing-over signal (CO), and
   a numerical control means changing-over means (COC) having a plurality of changing-over circuits (COS(n)) for connecting a selected one of the plural angular position sensing means (POS(n)) with a selected one of said plurality of numerical control means (CND(n)), in response to said changing-over signal (CO) so that said selected numerical control means (CNC(n)) is fed, in the reverse sense, said angular position signal (P(n)) sensed by the selected one of the plural angular position sensing means (POS(n)), and so that a driving motor associated with the selected angular position sensing means is controlled in response to said angular position signal (P(n)).

* * * * *